(12) United States Patent
Govindarajan et al.

(10) Patent No.: US 7,209,248 B1
(45) Date of Patent: Apr. 24, 2007

(54) MANAGING THE LIFETIME OF DISTRIBUTED RESOURCE DATA USING TEMPORAL SCOPES

(75) Inventors: Kannan Govindarajan, Boston, MA (US); Sekhar Sarukkai, Sunnyvale, CA (US); Shamik Das Sharma, Sunnyvale, CA (US); Shankar Umamaheshwaran, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1305 days.

(21) Appl. No.: 09/733,027

(22) Filed: Dec. 8, 2000

(51) Int. Cl.
*G06F 15/00* (2006.01)
*G06F 9/44* (2006.01)

(52) U.S. Cl. .................... 358/1.15; 717/108
(58) Field of Classification Search ............. 358/1.15; 709/228, 222, 203, 208, 227; 707/103, 8, 707/9, 10; 717/108
See application file for complete search history.

(56) References Cited

U.S. PATENT DOCUMENTS 5,717,860 A * 2/1998 Graber et al. ............. 709/227

6,584,505 B1 * 6/2003 Howard et al. ............. 709/225
6,691,113 B1 * 2/2004 Harrison et al. ............ 707/10
6,751,658 B1 * 6/2004 Haun et al. ................ 709/222

OTHER PUBLICATIONS

Microsoft Press Computer Dictionary, Second Edition, 1994, Microsoft Press, Second Edition, p. 276.*

* cited by examiner

*Primary Examiner*—King Y. Poon

(57) ABSTRACT

A method and system for enabling a client to programmatically manage the lifetime of groups of distributed resources is herein provided. The method includes grouping client-specific resource data usage generated from blocks of instruction sequences bounded by scope instructions. A "begin scope" instruction invokes a method initiating the temporal scope. Client-specific resource data generated during execution of subsequent instructions is tracked by the distributed infrastructure. When an "end scope" instruction is received, the client-specific resource data tracked under the temporal scope is deleted from the distributed infrastructure. Client-specific resource data may be tracked under two types of temporal scopes: a transient and a persistent temporal scope. Data tracked under a transient scope does not survive beyond the lifetime of the client connection, whereas data tracked under a persistent scope may survive beyond the lifetime of the client connection. Lastly, temporal scopes may generally be nested.

22 Claims, 11 Drawing Sheets

```
While (not done())
{
    ⎧ begin scope;          ⎫
    ⎪ create resource 1;    ⎪
    ⎨ find resource 2;      ⎬ — 151
    ⎪ use resource 2;       ⎪
    ⎩ end scope;            ⎭
}
```
— 149
— 153 (begin scope)
— 155 (end scope)

FIG. 7

```
While (not done())
{
    ⎧ begin first scope;
    ⎪ create resource 1;
    ⎪   ⎧ begin second scope;
    ⎪   ⎪ greate resource 3;
    ⎨   ⎨ find resource 4;
    ⎪   ⎪ save resource 4 "printer" in
    ⎪   ⎪     persistent-folder;
    ⎪   ⎩ end second scope;
    ⎪ find resource 2;
    ⎪ use resource 2;
    ⎩ end first scope;
}
```
— 175
— 177 (begin first scope)
— 179 (begin second scope)
— 184, — 181, — 183
— 185 (end second scope)
— 187 (end first scope)

FIG. 8

MANAGING THE LIFETIME OF DISTRIBUTED RESOURCE DATA USING TEMPORAL SCOPES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO APPENDICES A AND B

Appendices A and B contain an architectural specification and a programmer's guide.

CROSS-REFERENCE TO CD-ROM APPENDIX AND APPENDIX C

A CD-ROM Appendix containing a computer program listing is submitted on a compact disc, which is herein incorporated by reference in its entirety. The total number of compact discs including duplicates is two. Appendix C, which is part of the present specification, contains a list of the files contained on the compact disk.

BACKGROUND OF THE INVENTION

1. Field of the Invention

The present disclosure relates to distributed system architectures, and particularly to systems and methods for managing the temporal lifetime of client-specific distributed data maintained by the distributed system infrastructure.

2. Background

In non-distributed programming environments, many resource management functions are performed automatically at a low operating system level in response to high-level language instructions. Thus, to take a simplified example, in traditional standard function or object calls, memory may be automatically allocated by the operating system for code and data structures required for executing the called function or object. In addition, when processing returns to the calling function or object, memory used for executing the called function or object may likewise be automatically de-allocated. Higher-level languages also typically provide tools for programmers to access operating system level memory allocation processes for greater control over resource management variables. Effective management of resources is critical in computing systems to avoid inefficiency and, in some cases, system malfunction.

In a distributed programming environment, there are few convenient tools for programmers (or other users or processes performing operations in the distributed computing environment) to effectively manage resource usage (including usage of memory or disk space) generated by them. Distributed infrastructures may implement resource management processes under infrastructure control, but typically methods for managing resources are not exposed for programmer control. What is therefore needed is a convenient mechanism for programmers to manage resource usage in a distributed programming environment.

SUMMARY

The present invention is a method and system providing programmatic management over resource usage in a distributed programming environment. Because resource usage generated by clients at the distributed level is often task- or time-oriented, enabling clients to group resources on the basis of time (in addition to subject matter) for purposes of management provides a convenient method and system for clients to more effectively manage large amounts of resource data. In some embodiments of the present invention, therefore, clients may programmatically group resource data collected during execution of a particular instruction sequence in a distributed environment. In particular, in some embodiments, the distributed infrastructure may be instructed to begin a temporal scope (e.g., by invoking an API to the infrastructure). In response to the instruction, the distributed infrastructure tracks all client-generated resource data in a data structure until it receives an instruction to end the temporal scope. In response to the end scope instruction, the distributed infrastructure deletes all the resource data tracked for that time period between the instructions (i.e., the time period constituting the temporal scope).

In some embodiments, the client may specify a transient temporal scope or a persistent temporal scope. In a transient temporal scope, the client-generated resource data does not survive beyond the lifetime of the client connection in which it is created. In a persistent temporal scope, however, the client-generated resource data may survive beyond the lifetime of the client connection in which it is created.

In some embodiments, the scopes may be nested. In yet other embodiments, only scopes of the same type may be nested. Therefore, only persistent scopes may be nested in persistent scopes, and only transient scopes may be nested in transient scopes.

Other variations to the above embodiments are also described.

BRIEF DESCRIPTION OF THE DRAWINGS

FIG. 7 illustrates an implementation of a temporal scope in a computer instruction sequence, according to some embodiments of the invention.

FIG. 8 illustrates an implementation of nested temporal scopes in a programming sequence, according to some embodiments of the invention.

DETAILED DESCRIPTION

Figure 1:
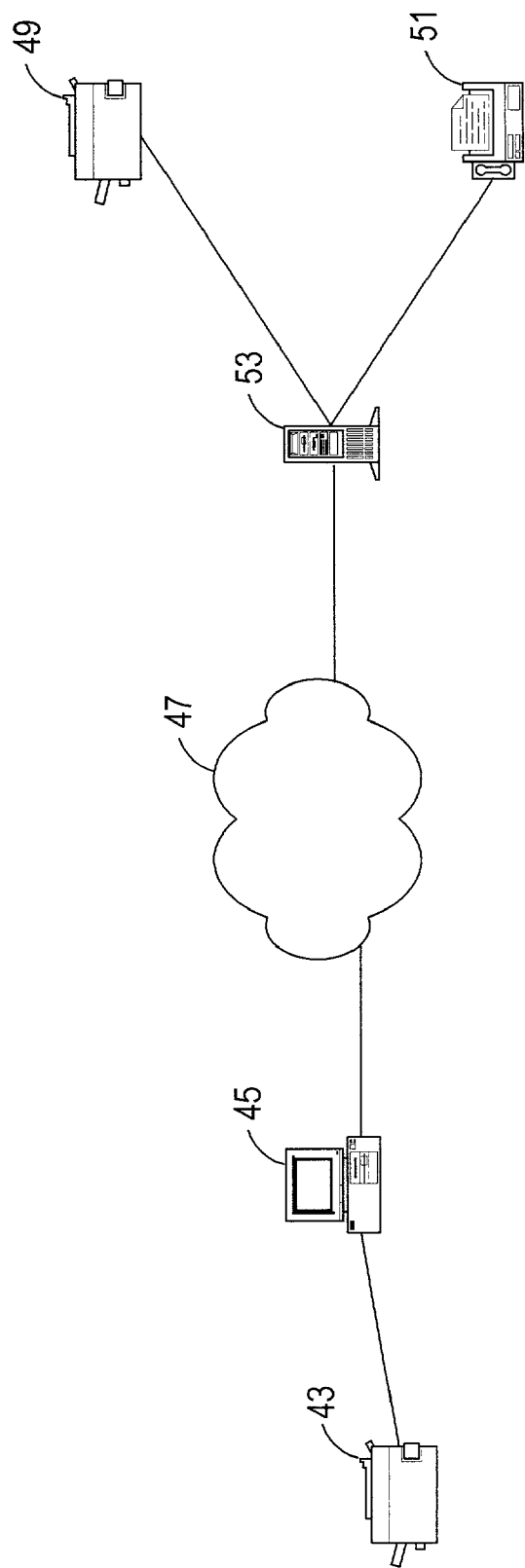
FIG. 1 is a block diagram illustrating a device-level view of a simplified distributed system in which the temporal scope mechanism of the present invention may be implemented, according to some embodiments of the invention.

The invention disclosed herein provides a mechanism, hereafter a "temporal scope," for performing client-based control over the lifetime of client-specific resource data in a distributed system architecture, according to some embodiments of the invention. In particular, some aspects of the present invention are described in detail in reference to the E-Speak Service Engine Development Platform, Developer Release 3.03 (hereafter, "E-Speak Platform"), a distributed object platform developed and released by the Hewlett-Packard Corporation of Palo Alto, Calif., under an open-source license (it is freely available at "http://www.e-speak.hp.com"). The E-Speak Architectural Specification, Developer Release 3.03, and the E-Speak Programmer's Guide, Developer Release 3.03 provide detailed specifications and descriptions of the E-Speak Platform, and were developed and released by Hewlett-Packard Corporation under an open-source license (also freely available at "http://www.e-speak.hp.com"). The E-Speak Architectural Specification, Developer Release 3.03, the E-Speak Programmer's Guide, Developer Release 3.03, and the E-Speak Service Engine Development Platform Release 3.03, are attached as Appendices A, B and CD-ROM Appendix C, respectively. It should be noted that although the present invention is herein disclosed primarily as implemented in the E-Speak Platform using object-oriented technology, it is not limited to a particular distributed platform or to a particular programming methodology, such as object-oriented programming. On the contrary, many distributed platforms may incorporate differing embodiments of the invention disclosed herein, and, generally, any distributed computational process (e.g., a legacy application) may be adapted by conventional programming techniques—e.g., wrapping the legacy application in a suitable object structure or otherwise adapting the process with a suitable interface—to employ the invention described herein. Additionally, a distributed architecture implementing an embodiment of the present invention may also be constructed using traditional procedural programming techniques (or a combination of object-oriented and procedural programming techniques).

For purposes of the detailed description, the following terms are defined. A "resource" is a generic reference to any computational process, such as a file server, an online banking service or an infrastructure-supplied searching function, that may be virtualized in a distributed computing system, and discovered or invoked by other resources. Resources may be classified in reference to how they are managed. An "external resource" refers to resources that are managed by an entity external to the distributed infrastructure, such as the provider of online banking services. "Core-managed resources" refers to resources that are supplied and managed by the distributed infrastructure, also referred to as the "core." Resources may also be classified in terms of their function. Three types of resources in this sense are important for the detailed disclosure herein. First, a "service" resource, or simply "service," generally refers to loosely-coupled network applications provided by an external service provider; an online banking resource offered by a bank is a paradigmatic service. Second, a "vocabulary" resource, or simply "vocabulary," is a core-managed resource used for organizing information for describing resources. Although vocabularies are core-managed, the descriptive information contained in a vocabulary is typically provided by an external entity, such as the online banking provider. In addition, certain default vocabularies are provided by the core as described herein. Third, a "contract" resource, or simply "contract," is a resource that contains interface, stub or other information needed for accessing a resource. The interface data is typically expressed in an IDL language specific to the distributed system; this ensures platform-independence for the distributed infrastructure. A "client" refers to any computational process, often controlled by a human agent, accessing resources via the distributed infrastructure, including external and core-managed resources. A client thus includes both a service provider (which uses the infrastructure to make its services available over the distributed network) and a service user (which accesses available resources).

Architecture Overview

FIG. 1 is a block diagram illustrating a device-level view of a simplified distributed system which may implement the temporal scope mechanism of the present invention, according to some embodiments. In FIG. 1, computers 45 and 53 are interconnected via communications medium 47. In some embodiments, computers 45 and 53 may be Hewlett-Packard 9000 computers executing the E-Speak Platform within an HP-UX® operating system version 11.00. The E-Speak Platform provides a distributed object infrastructure which may implement some embodiments of the temporal scope mechanism of the present invention. Communications medium 47 facilitates the transfer of electronic content between attached computers 45 and 53. In some embodiments, the communication medium 47 includes a global-area network, such as the Internet; the Internet comprises the millions of computers interconnected by the well-known TCP/IP communication protocol. The communication medium 106 may also include local area network (LAN), wide area network (WAN), metropolitan area network (MAN), a public Internet, a private intranet, a private computer network, a secure Internet, a private network, a public network, a value-added network, an interactive television network, a wireless network, and generally any other connection capable of delivering electronic content between computer devices. Communication medium 47 may operate with communication protocols other than TCP/IP, such as the Open Systems Interconnection developed by the International Standards Organization, and Netware from Novell Corporation of San Jose, Calif. Those skilled in art will recognize that the present invention may operate on numerous and various computers, development software, operating systems and communication mediums, and the present invention is not limited to any particular type or brand of computer, development software, operating system or communications medium. Returning to FIG. 1, computers 45 and 53 are connected to external resources; specifically, computer 55 is connected to printer 43, and computer 53 is connected to printer 49 and fax 51.

Figure 2:
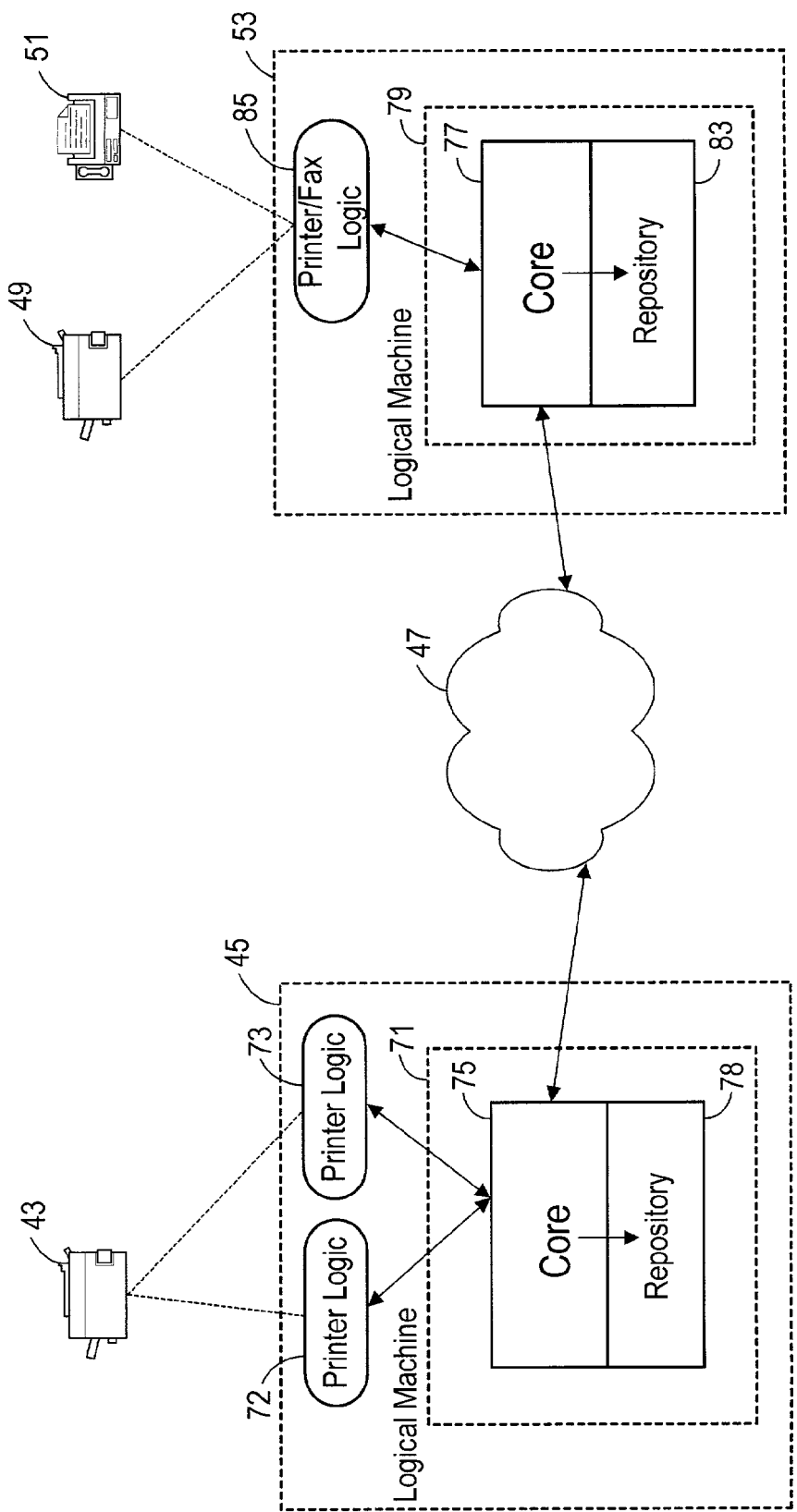
FIG. 2 is a block diagram illustrating a process-level view of the distributed system of FIG. 1.

FIG. 2 is a block diagram illustrating a process-level view of the distributed system of FIG. 1. Computers 45 and 53 (or, more precisely, the address spaces of computers 45 and 53) execute Logical Machines 71 and 79 respectively. Logical Machines 71 and 79 comprise the infrastructure logic for the E-Speak Platform. The distributed system, in this simplified example, comprises infrastructure logic, i.e., Logical Machines 71 and 79, and the external resources—e.g., 43, 49, and 51—that they interconnect. Each Logical Machine 71 and 79 is a single instance of the E-Speak Platform. It should be noted that multiple Logical Machines may execute on a single physical machine, or the components of a single Logical Machine may be distributed across multiple machines. Each Logical Machine, e.g., 71 and 79, consists of a core, 75 and 77, and a repository, 78 and 83. Logical Machines 71 and 79 are interconnected via their cores 75 and 77, and cores 75 and 77 are connected via communications medium 47. Each core, e.g., 75 and 77, consists of the process logic comprising the E-Speak Platform infrastructure; this includes, for example, process logic for registering, invoking, discovering and managing resources, for mediating and controlling resource access and access rights, for processing and routing messages between resources, and for maintaining client-specific interface data. The principal core processes are themselves core-managed resources. The core, e.g., 75, mediates all resource access (to both external and core-managed resources) using metadata stored in the repository, e.g., 78. Each resource, whether external or core-managed, which is accessible by a core has metadata describing it (vocabulary) and providing access to it (contract). The core 89 only operates on the resource metadata, and does not access resource implementation logic directly (except for core-managed resources). Instead, the core provides directs and controls communication between resources via message passing. A core "accesses" a resource specific implementation logic by passing a message to a resource-specific handler, or "resource handler" (described in reference to FIGS. 3A and 3B); the resource handler, however, is not part of the core architecture.

Returning to FIG. 2, printer device 43 is connected to core 75 via implementation logic 72 and implementation logic 73 which provide services implementing the printer device 43; printer device 49 and fax device 51 are connected to core 77 via implementation logic 85 which provides fax/printer services implementing the printer 49 and fax 51. As illustrated in FIG. 2, a physical device may be implemented by one or more implementation logic, and likewise, one implementation logic may provide services implementing multiple physical devices. As used herein, "resource" refers generally to the process logic, e.g., 72, 73 and 85, implementing physical devices, e.g., 43, 49 and 51, and not primarily to the physical devices themselves. After a resource is connected or registered with a core, the resource becomes part of the distributed system, and becomes potentially accessible to other resources or clients likewise connected to a core. Thus, a user that connects to core 75 is connected locally to, in the system illustrated in FIG. 2, printer resources 72 and 73, and remotely to printer/fax resource 85.

Figure 3A:
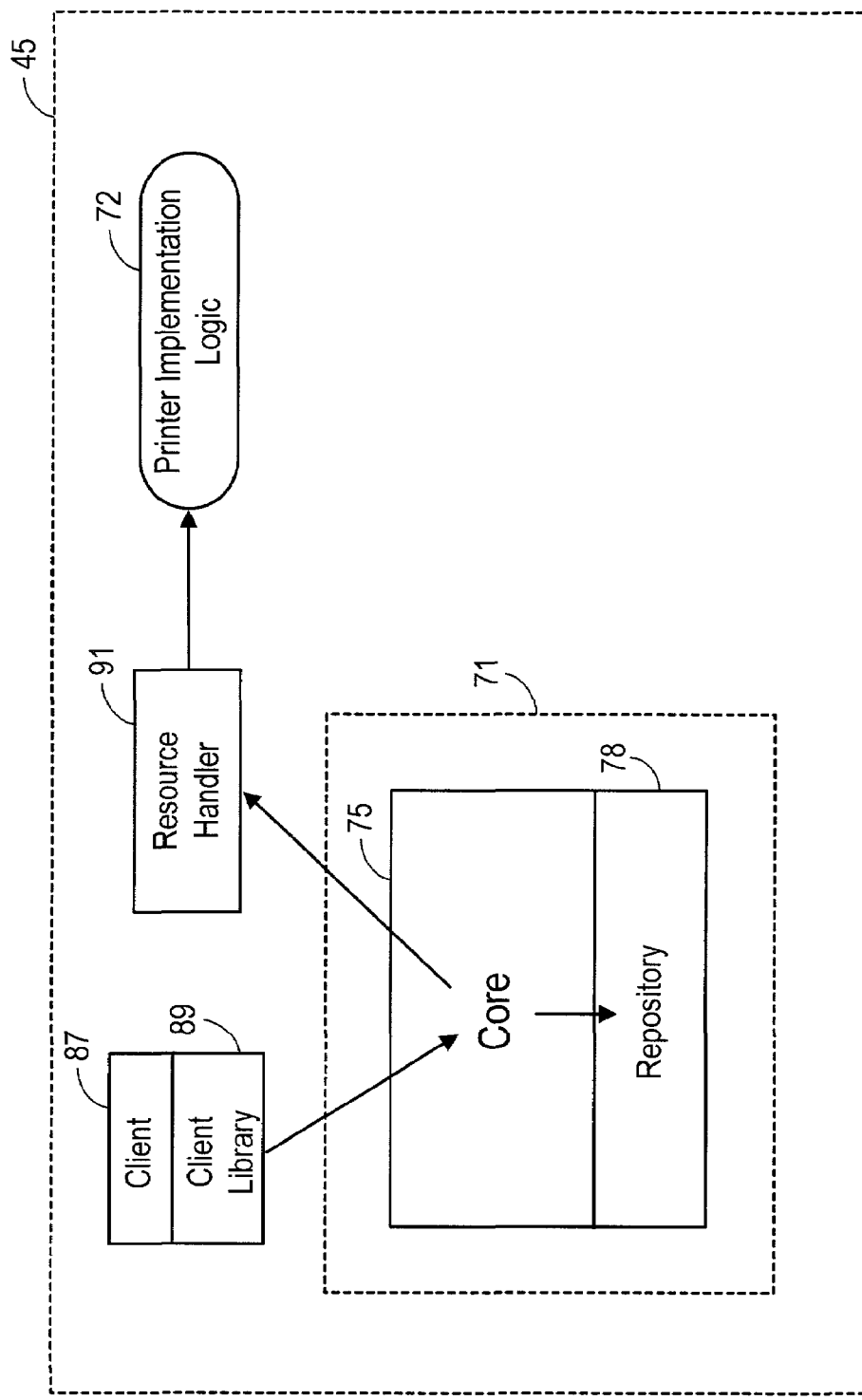
FIG. 3A is a block diagram illustrating local resource access in a Logical Machine, according to some embodiments of the invention.
Figure 3B:
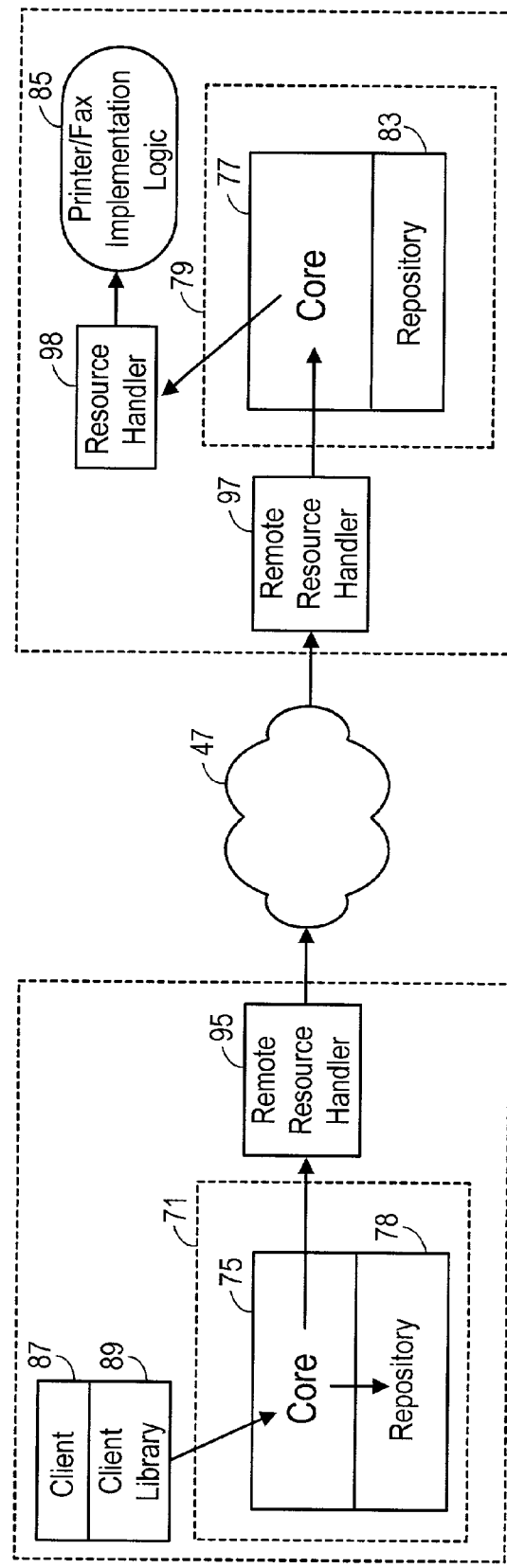
FIG. 3B is a block diagram illustrating remote resource access via two Logical Machines, according to some embodiments of the invention.

FIGS. 3A and 3B are block diagrams illustrating local and remote resource access in the distributed system depicted in FIG. 1. In particular, resource access is illustrated in the simplified situation in which a client already possesses a reference to the resource, and thus the resource does not need to be discovered. Turning to FIG. 3A, local resource access is illustrated in reference to a client connected to Logical Machine 71 accessing printer logic 72. FIG. 3A shows logical machine 71, printer resource 72, resource handler 91, and client process 87 executing in the address space of machine 45. Client process 87 accesses the core 75 via a client library 89 providing APIs to the core 75; the client library 83 is provided as a component of the E-Speak Platform. Client process 87 is typically a resource requesting access to another resource, for example, a word processing resource requesting printing services from printing resource 72. Client 87 therefore sends a message to the core 75 naming the printer resource 92, e.g., by providing the URL for printer resource 72, and typically attaching a payload (in this case, for example, a document to be printed). After the core 90 receives the message, the core 75 accesses repository 78 for the metadata belonging to printer resource 72 to determine which resource handler processes requests to printer resource 72. The core 75 discovers the appropriate resource handler 91 from the metadata, and sends the message to it. The resource handler 91 then interfaces the resource implementation logic 72 and passes the service-dependent instructions and data to execute the client's 87 request. All local resource access is performed in the same manner. Thus, after printer resource 92 processes the request, it pass a result of the request back to the client process 87; in this situation, the printer resource 92 operates as a new "client process" sending a return message to the core, which is forwarded by the core to a resource handler for the client 87.

Turning to FIG. 3B, remote resource access is illustrated in reference to a client connected to Logical Machine 71 accessing remote printer/fax logic 85. In FIG. 3B, core 75 and its repository 78, and core 72 and its repository 83, execute in different address spaces on different physical machines, e.g., computer 45 and computer 53 respectively. Cores 75 and 77 are connected via remote resource handlers associated with each core; thus, core 75 is connected to (and executes in the same address space as) remote resource handler 95, and core 72 is connected to (and executes in the same address space as) remote resource handler 97. The remote resource handlers 99 and 97 are, in turn, connected via communications medium 47. Client process 87, executing in the core 75 address space, sends an access request message to core 87 naming remote printer/fax resource 85, e.g., providing the URL to remote resource 85. A routing process in core 75 determines that remote resource 85 is local on core 77, and routes the message to remote resource handler 95. Remote resource handler 95 in turn sends the message to counter-part remote resource handler 97 executing in the core 77 address space. The remote resource handlers 95 and 97 mediate communication between cores 75 and 77, and maintain information such as which remote resource handler the message is to be routed, and the communication method or protocol to be used over communication medium 47. After the message is received by remote resource handler 97, the process of accessing remote printer/fax resource 85 is then identical to local resource access described in reference to FIG. 3A; in this situation, however, remote resource handler 97 operates as the local client process sending the message to local core 77 (core 77 is now local to remote resource handler 97). Thus, remote resource handler 97 sends the message to the core 77, which then accesses repository 83 for the metadata of printer/fax resource 85. The core 77 determines the appropriate resource handler 105 for the printer/fax resource 85, and sends the message to resource handler 98 accordingly. The resource handler 105 then interfaces printer/fax logic 85 and sends resource-specific data and instructions to printer/fax resource 85 to execute the request. Printer/fax resource 85 may then operate as a second client process when returning a message containing results back to client process 87.

Figure 4:
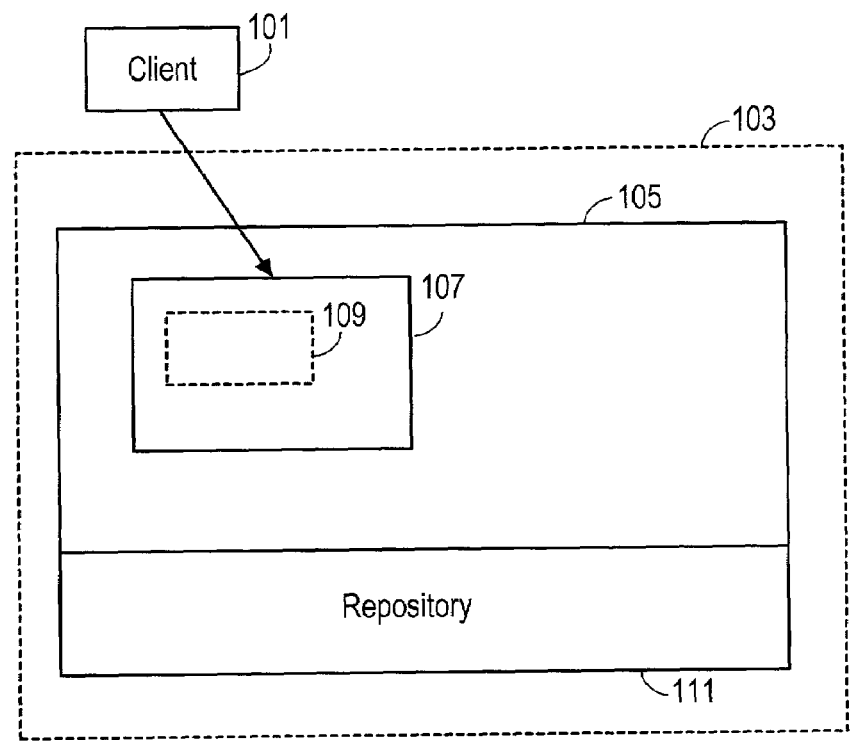
FIG. 4 is a block diagram illustrating selected components of an instance of a Logical Machine, according to some embodiments of the present invention of the invention.

FIG. 4 is a block diagram illustrating selected components of an instance of a Logical Machine, according to some embodiments of the present invention. In FIG. 4, Logical Machine 103, consists of a core 105 and a repository 111. The core 105 includes one or more protection domains for each client, e.g., 101, connected to the core 105. The protection domain 107 is analogous to a home directory for the client 101, and contains information needed by the core 105 for managing the client 101, including tracking and managing the amount of space in the repository 111 allocated to the client 105. In this regard, each protection domain 109 is associated with a resource space quota, and maintains three fields associated with the quota: space used, soft limit, and hard limit. A protection domain 107 may allocate resources (typically repository space for metadata and resource bindings) up to the hard limit, depending on the memory usage by the core 105. In addition, the protection domain 107 encapsulates the client's 101 view of the system of resources and mediates communication between the client 101, the infrastructure and the resources distributed over the system. All message passing, for example, to the client 101 is performed via the protection domain 107. Lastly, the protection domain 107 includes a name-space 109 managed by the client 101 which provides the client 101 an organizing tool for managing resource use by the client 101 (described in reference to FIG. 5).

Figure 5:
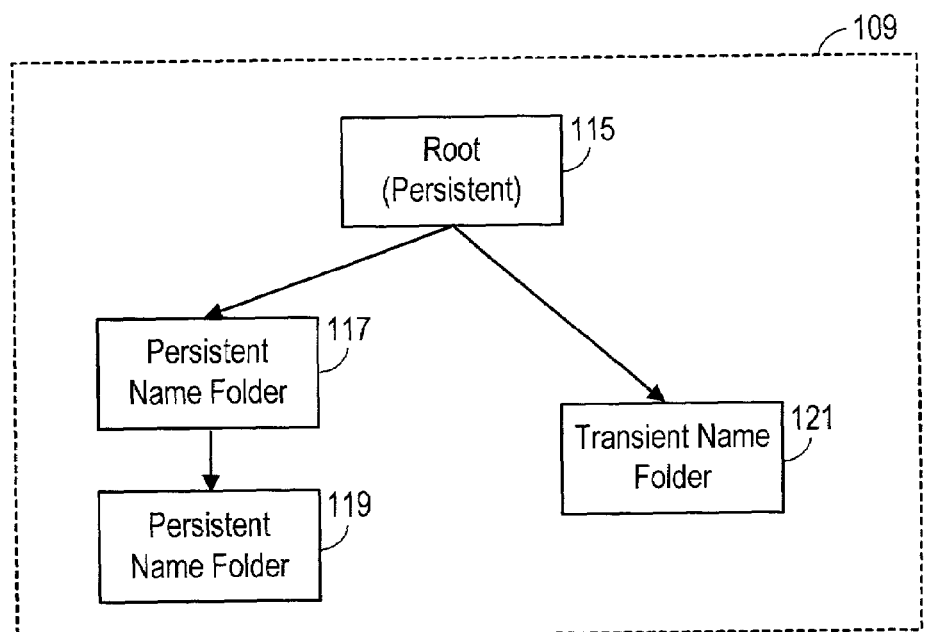
FIG. 5 is a block diagram illustrating the client namespace, according to some embodiments of the invention.

FIG. 5 is a block diagram illustrating in more detail the client name-space, according to some embodiments. In FIG. 5, name-space 109 includes name-folders 115, 117, 119 and 121 organized in a folder-subfolder tree structure with a root folder 115 operating as the root node, according to some embodiments. In particular, name-folders include a root folder 115 having two sub-folders, a persistent name-folder 117 and a transient name-folder 121. The persistent name-folder 117 in turn includes a sub-folder, namely, a second persistent name folder 119. In some embodiments, only persistent sub-folders may be created in a parent persistent folder; likewise, in some embodiments, only transient sub-folders may be created in a parent transient folder. A transient folder is a folder that does not survive beyond the lifetime of the client connection in which it is created. A persistent folder, on the other hand, may survive beyond the lifetime of the client connection in which it is created. In some embodiments, the core 105 provides a default current name-folder to name-space 109, which is, in some embodiments, a persistent name-folder, e.g., "\home." The current name-folder is the name-folder within which the client 101 is currently operating. Thus, whether the current-name folder is a persistent folder or a transient folder is important because, for example, if the client 101 creates services within a persistent folder, the metadata description of the service will persist in the repository 111 of the core 105, even if the resource handler for the service disconnects from the core 105.

Figure 6:
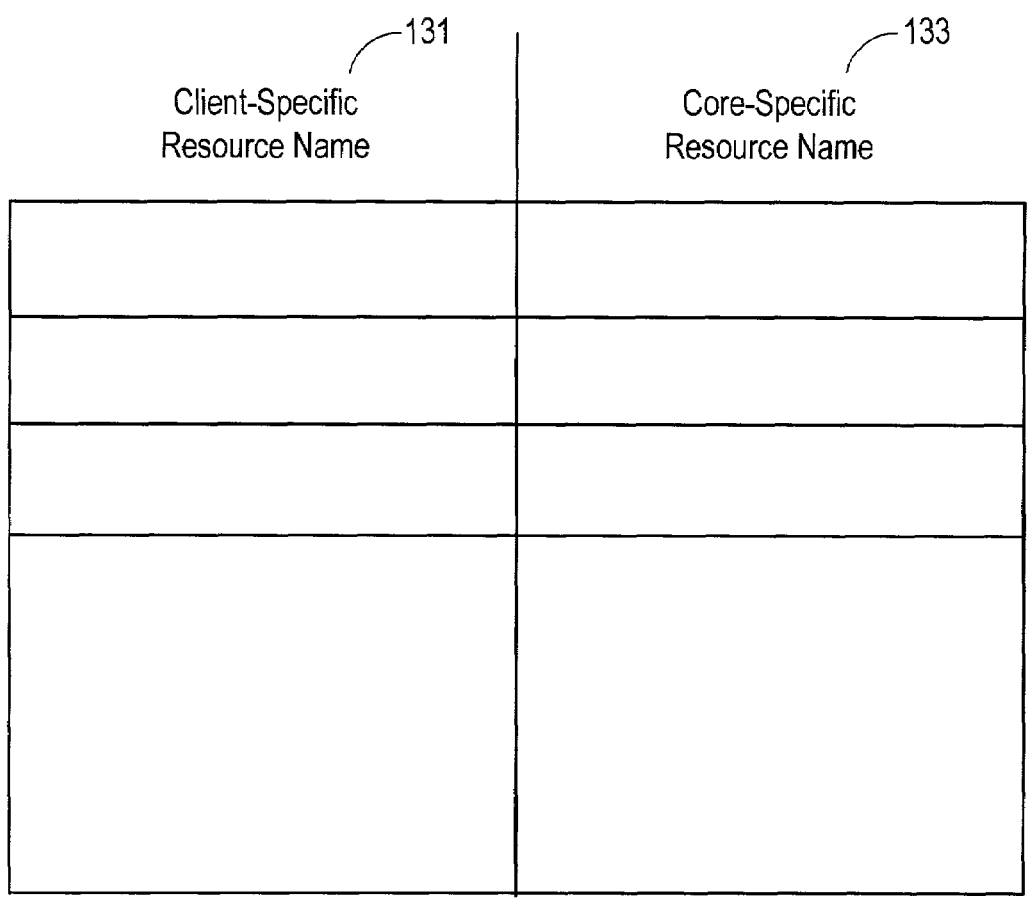
FIG. 6 is a block diagram illustrating a name-folder, according to some embodiments of the invention.

Name-folders are typically used by clients 101 to manage name bindings to services that they have discovered or created. Thus, for example, a client 101 may discover commonly used printer resources and name them in persistent folder; by doing this, the client 101 may disconnect from the core 105, and then have the bindings automatically available to the client 101 when the client 101 reconnects to the core 105. FIG. 6 is a block diagram illustrating a name-folder in more detail, according to one embodiment of the invention. In FIG. 6, a name folder in one embodiment is illustrated as a table having two columns—columns 131 and 133—is illustrated. Column 131 consists of client-specific resource names which are names selected by a client for naming resources discovered or created by the client; column 131 provides in essence a local name-space for the client. Column 133 provides a column of core-specific resource names which are the unique system-wide names corresponding to the client-specific resource names of column 131. Columns 131 and 133 therefore provides a local to global name-space mapping, and therefore client-specific names may be considered virtualized resource addresses. In some embodiments, the global name provided in column 133 is the Uniform Resource Locator ("URL") for the resource.

The operation of the virtual name mapping scheme of a name-folder may be illustrated by the following example. An attached Hewlett-Packard printer is a service registered with the core. In the core, the address of the printer may be specified as "c:\devices\HP_printer_1234." A first client may have found out, for example, using a search function provided by the core, that this printer is accessible through the core. Subsequently, the first client may have associated a name "attached_printer" to the Hewlett-Packard printer and included the printer as a resource in a name-folder in its protection domain. The first client's name-folder may then have an entry "attached_printer" in the client-specific resource name column 131 that maps to an entry "c:\devices\HP_printer_1234" in the core-specific resource name column 133. Later, when the first client requests to access to "attached_printer," the core uses the first client's name frame to map the client-specific resource name, "attached_printer," to the corresponding core-specific resource name, "c:\devices\HP_printer_1234." In a similar manner, a second client (or the first client) may specify a different name for the Hewlett-Packard printer. For example, a second client 104 may associate a name "laserprinter" to the Hewlett-Packard printer, and insert into a name-folder. The corresponding name will appear in the client-specific resource name column 131 of the second client's name-folder, mapped to the corresponding core-specific resource name of the printer, "c:\devices\HP_printer_1234." Thus, the same client or different clients may refer to the same resource using different resource names. In other embodiments, the client-specific resource name and the core-specific resource name may be the same.

Temporal Scopes

A "temporal scope" as used herein refers to a mechanism for enabling a client to programmatically manage the lifetime of a group of one or more resources used or created by the client. Two types of temporal scopes are disclosed herein: persistent and transient scopes. A transient scope, like a transient folder, is a scope (group of resources) that does not survive beyond the lifetime of the client connection in which it is created. A persistent scope (group of resources), like a persistent folder, on the other hand, may survive beyond the lifetime of the client connection in which it is created.

FIG. 7 illustrates an implementation of a temporal scope in a computer instruction sequence, according to some embodiments of the present invention. In FIG. 7, a hypothetical sequence of instructions 149 (typically method calls using the E-Speak APIs provided in the client library 87 (FIG. 3B)) is shown. Specifically, a conditional while loop is illustrated containing a sequence of five instructions, beginning with a "begin scope" instruction 153 and an "end scope" instruction 155. As illustrated in this example, the "temporal scope" mechanism of the present invention, according to some embodiments, refers to the use of the scope instructions 153 and 155 to group resource data that is accumulated by the distributed infrastructure in response to the execution of instruction sequences bounded the scope instructions 153 and 155. Thus, client-specific resource data—typically resource bindings and metadata generated by the core in the repository during resource discovery, use and creation by the client—bounded by scope instructions 153 and 155 constitute a resource data group 151 that is uniformly treated by the temporal scoping mechanisms. Furthermore, as illustrated in FIG. 8, according to some embodiments, scopes may be nested. FIG. 8 illustrates an implementation of nested temporal scopes in a programming sequence, according to some embodiments of the present invention. Thus, as shown in FIG. 8, a second conditional while loop 175 is illustrated that includes a second set of scope instructions—i.e., "begin second scope" instruction 179 and an "end second scope" instruction 185—forming a second resource data group 183; the second resource data group 183 is, in turn, nested within (i.e., executed within) a first while loop containing first resource group 181 (the first resource group is defined by "begin first scope" instruction 177 and an "end first scope" instruction 187).

Figure 9A:
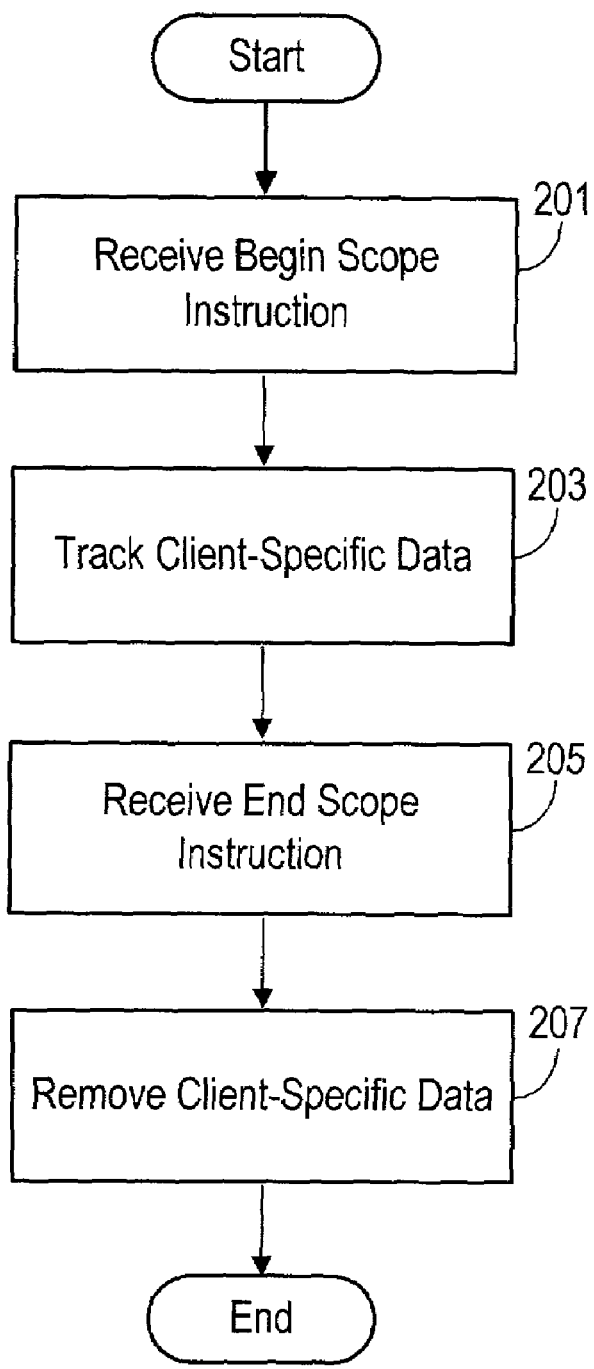
FIG. 9A is a flow diagram illustrating the operational stages of a single (un-nested) temporal scope, either persistent or transient, according to some embodiments of the invention.
Figure 9B:
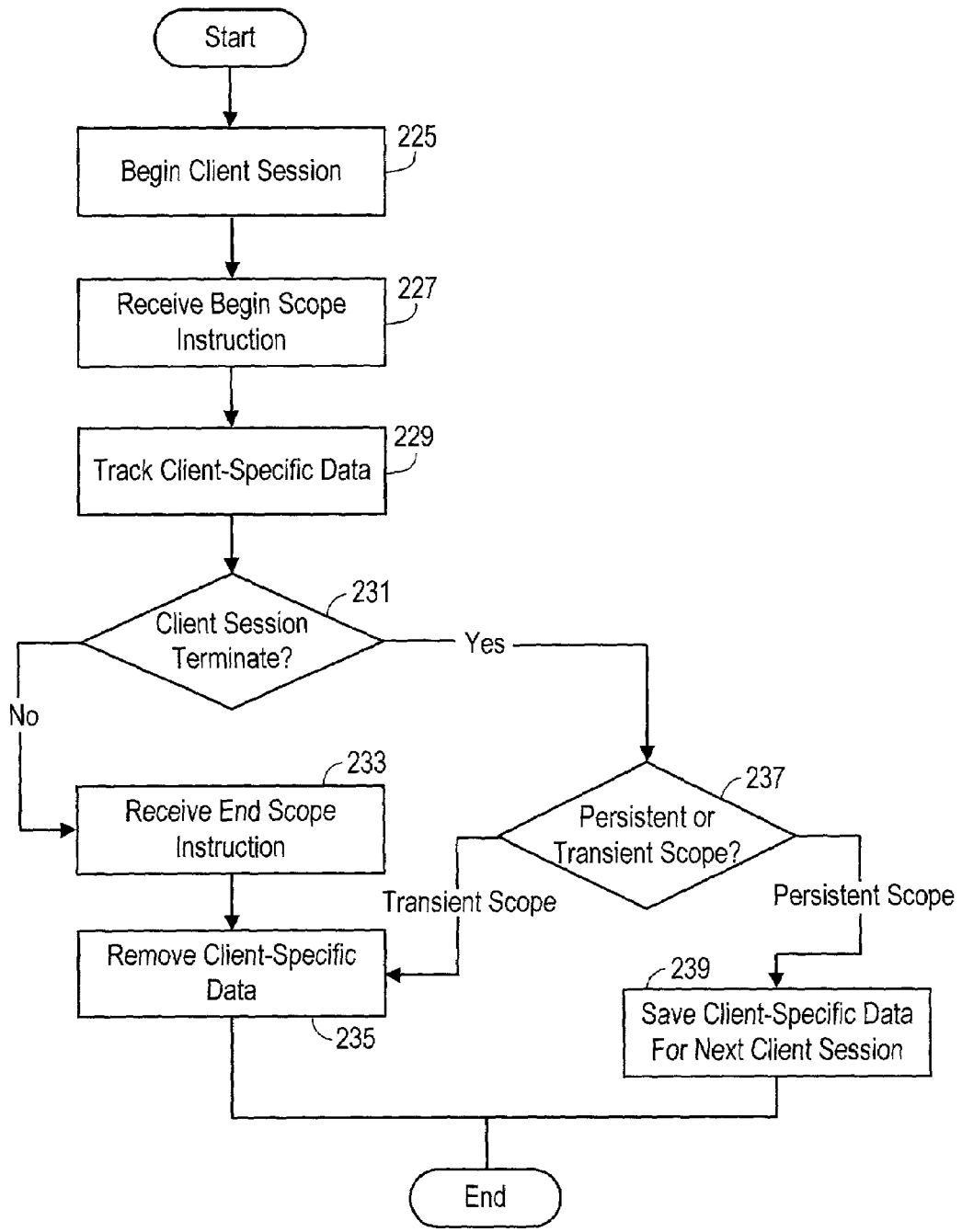
FIG. 9B is a flow diagram illustrating the operational differences between persistent scopes and transient scopes, according to some embodiments of the invention.
Figure 9C:
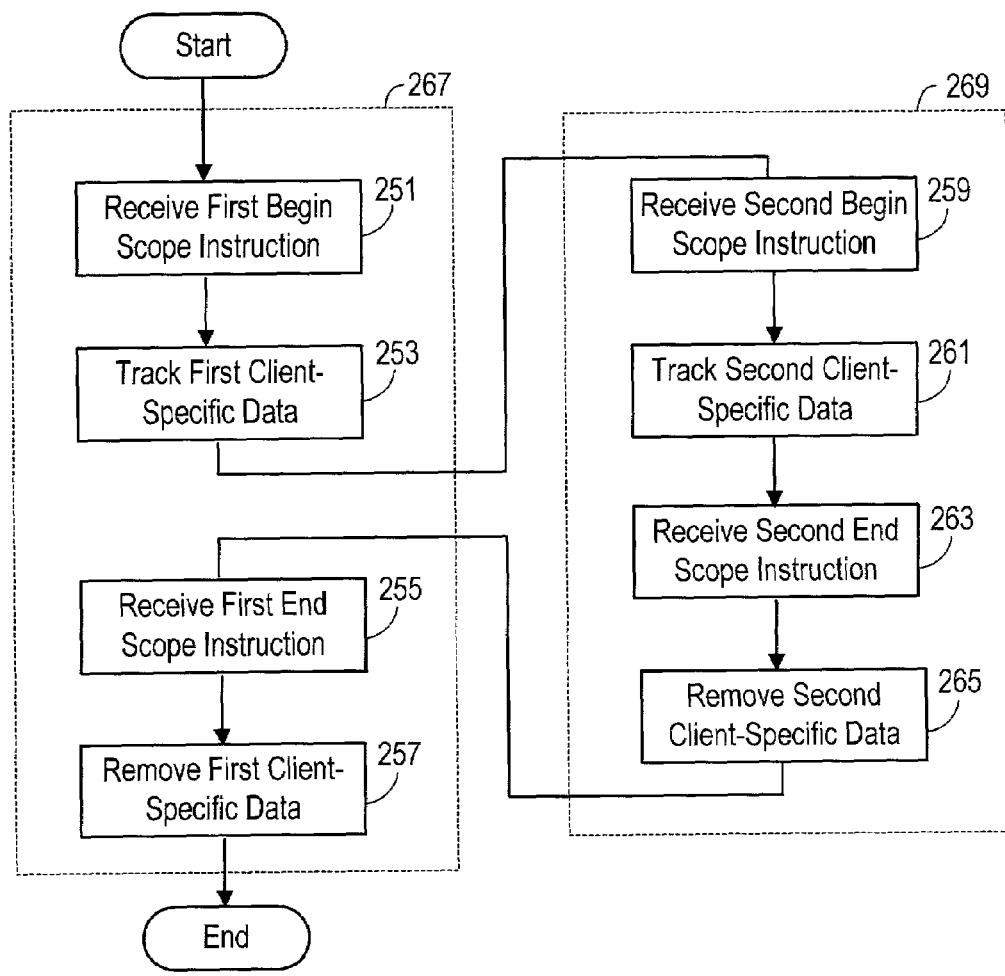
FIG. 9C is a flow diagram illustrating the operational stages of nested temporal scopes, according to some embodiments of the invention.

The operation of the scope instructions are described in reference to FIGS. 9A, 9B and 9C, according to some embodiments. FIG. 9A is a flow diagram illustrating the operational stages of a single (un-nested) temporal scope, either persistent or transient, according to some embodiments. The flow-diagram in FIG. 9A is herein described in reference to the illustrative instruction sequence provided in FIG. 7. In stage 201, processes in the client library or core receive "begin scope" instruction 153. (In some embodiments, temporal scopes may be executed by classes defined in the client library; in other embodiments, temporal scopes may be executed by classes defined in the core; in some embodiments, a combination of classes, some defined in the core and some in the client library, may be used to implement the temporal scoping mechanisms described here.) In stage 203, the client library, in response to the "begin scope" instruction 153 constructs a tracking data structure in the client-space to track the resources subsequently created, found or used by the client. (One embodiment of the tracking data structure is described in reference to FIG. 10.) Thus, as illustrated in FIG. 7, the "begin scope" instruction is followed by illustrative instructions to "create resource 1," "find resource 2," and "use resource 2." During execution of these instructions, the client library will create in the repository client-specific data in the client-space, including name-bindings and metadata for resources 1 and 2. As this data is sequentially created, it is tracked using the tracking data structure. In addition, the resource space quota for the client's protection domain is adjusted to reflect the usage of client-space consumed by the client-specific data. In stage 205, the client library receives "end scope" instruction 155 and subsequently deletes all client-specific data from the repository as provided in the tracking data structure for that particular scope, including resource references in the client name-frames and resource metadata in the repository. The client's protection domain space quota is also adjusted accordingly. This sequence of events—begin scope, tracking, end scope, deletion—is performed for each iteration of the while loop.

FIG. 9B is a flow diagram illustrating the operational differences between persistent scopes and transient scopes, according to some embodiments. The flow-diagram in FIG. 9A is herein described in reference to the illustrative instruction sequence provided in FIG. 8. In stage 225, a client initiates a client session by connecting to the core; the core instantiates the protection domain belonging to the client, thus enabling the client to communicate with the core. In stages 227 and 229, the system operates identically as in stages 201 and 203 described in reference to FIG. 9A, i.e., the client library receives a "begin scope" instruction and according initiates tracking of client-specific resource usage. In stage 231, however, process flow is interrupted by the termination of the client session, e.g., by a communication failure between the client and the core, or the client electing to disconnect. If the client session terminates in stage 231, then in stage 237 process flow forks based upon whether the "begin scope" instruction 153 indicates a persistent or transient scope (typically by method type or parameter passing). If the "begin scope" instruction 153 is persistent, then in stage 239, all client-specific data placed by the client in persistent name-folders since the beginning of the scope is grouped by the scope and available for use in the next client session, according to some embodiments. (Computer instruction 184 in FIG. 8 illustrates an instruction sequence wherein client-specific data is inserted by a client into a persistent name-folder.) In some embodiments, a tracking data structure is used to track the persistent data in the client name-folders associated with the temporal scope. (One embodiment of the tracking data structure is described in detail in reference to FIG. 10.) If in stage 237 the "begin scope" instruction 153 is transient, then, on the other hand, the client library deletes the client specific data accumulated during the scope from the repository. If in stage 231, the client session does not terminate, then in stages 233 and stage 235, the system operates identically as in stages 205 and 207 described in reference to FIG. 9A, i.e., the client library receives an "end scope" instruction 155 and accordingly deletes the client-specific data. After deletion or addition of client-specific resource data, the client's protection domain space quota is accordingly adjusted.

FIG. 9C is a flow diagram illustrating the operational stages of nested temporal scopes, according to some embodiments. The flow-diagram in FIG. 9C is herein described in reference to the illustrative instruction sequence provided in FIG. 8. In operation, nested temporal scopes operate similarly to non-nested ones, except that process flow within the first temporal scope is temporarily halted and resumes in a second temporal scope having essentially identical process stages (as execution under the first temporal scope); next, after execution of instruction sequences under the second temporal scope, process flow returns to the instruction sequence under the first temporal scope. Scopes may in principle be nested multiple times. In addition, in some embodiments, persistent scopes may only be nested within persistent scopes, while transient scopes may be nested in either persistent or transient scopes. In some embodiments, nested persistent and transient scopes are treated identically to non-nested persistent and transient scopes as described in reference to FIG. 9B.

Turning now to FIG. 8, two temporal scopes are illustrated, namely, temporal scope 183 within which temporal scope 181 is nested. Process flow for temporal scopes 183 and 181 is illustrated in FIG. 9C; in particular, process flow stages comprising temporal scope 183 (FIG. 8) are shown encapsulated in dotted box 267 (left-hand column), and the process flow stages comprising temporal scope 183 (FIG. 8) are shown encapsulated in dotted box 269 (right-hand column). In some embodiments, process flow for each separate temporal scope 183 and 181, as indicated in boxes 267 and 269, is essentially identical to the process flow for non-nested temporal scopes as illustrated in reference to FIGS. 7 and 9A; the exception is that process flow is interrupted in the first temporal scope (box 267).

Returning to FIG. 9C, in stage 251, the client library receives a "first begin scope" instruction 251. In stage 253, the client library, in response to the "first begin scope" instruction 251 constructs a tracking data structure in the client-space to track the resources subsequently created, found or used by the client. (The tracking data structure is described according to some embodiments in reference to FIG. 10.) In stage 259, the client library receives a "second begin scope" instruction. At this point, the client library ceases tracking client-specific resource usage under the first temporal scope. In stage 261, the client library begins tracking client-specific resource usage under the second temporal scope. In some embodiments, the client library creates a second data structure in the client-space for tracking resource usage; in some embodiments, the client library uses a different component of a single data structure for tracking each temporal scope. (The creation and use of a tracking data structure is described in reference to FIG. 10, according to some embodiments.) In stage 263, the client library receives a "second end scope" instruction 155 and subsequently deletes all client-specific data from the repository as provided in the tracking data structure for the second temporal scope, i.e., temporal scope 181 (FIG. 8). At this point, process flow returns to the first temporal scope, and the client library automatically returns to tracking client-specific resource usage under the first temporal scope. In stage 255, the client library receives the "first end scope" instruction, and in stage 257, deletes all client-specific resource data accumulated under the first scope 181. In some embodiments, the client's protection domain space quota is adjusted downward during each temporal scope as client-specific resource data is accumulated under the scope, and is adjusted upward as each temporal scope completes and client-specific resource data is deleted.

Figure 10:
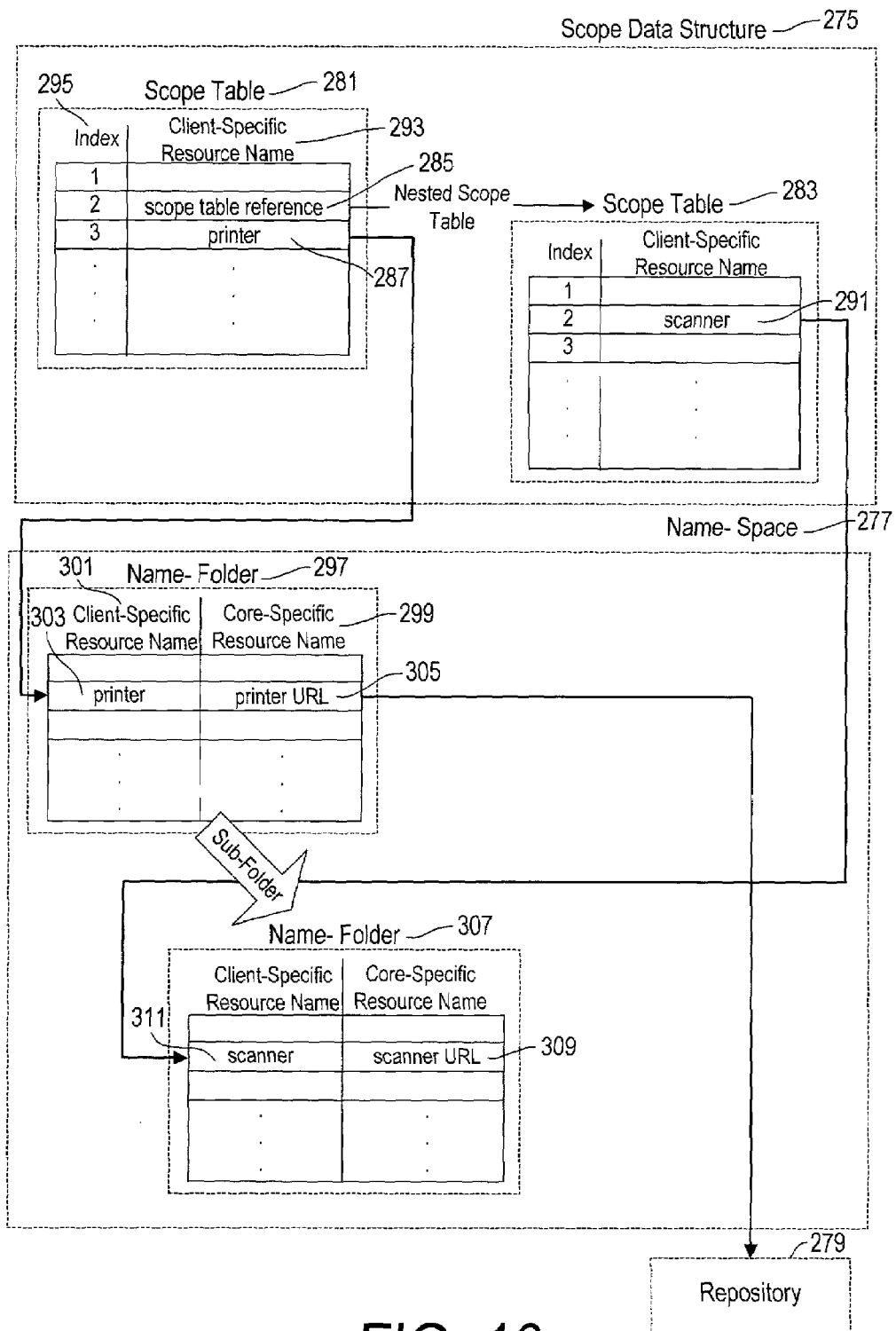
FIG. 10 is a block diagram illustrating the operation of the tracking data structures used to implement temporal scopes, according to some embodiments of the invention.

FIG. 10 is a block diagram illustrating the operation of tracking data structures, hereafter "scope tables," used to implement temporal scopes and nested temporal scopes, according to some embodiments. In FIG. 10, scope tables 281 and 283, name-folders 297 and 307, and a repository 279 are shown. Scope tables 281 and 283 and name-folders 297 and 307 are structures maintained by the client library and core in the client-space, according to some embodiments. Name-folders 297 and 307, as discussed in reference to FIGS. 4 and 5, are structures used by a client to organize and name the resources that the client discovers, uses or creates. Thus, as shown in reference to name-folder 297, a name table is shown having a left-hand column for storing the client-specific (local) resource names 301, and a right-hand column for storing corresponding core-specific (global) resource names 307. In some embodiments, scope tables 281 and 283 are also tables consisting of a left-hand column of sequential numbers 295, and a right-hand column 295 of client-specific resource names 293, as illustrated in reference to scope table 281.

In operation, the client library, in response to receiving an initial "first begin scope" instruction creates an initial or root scope table, e.g., 281. The client library then tracks the various client-specific resource data generated by client interaction with the core (e.g., finding, using and registering resources) in the scope table in a sequential manner. In the case of persistent temporal scopes, in some embodiments, only those resources named and stored by a client in a persistent folder generate persistent resource data under the persistent temporal scopes; other resources that are generated under a persistent scope that are not named and placed in persistent name-folders by the client are treated as transient resource data. Thus, in the illustrative example of FIG. 10, a local name "printer" 303 given by the client to a printer resource in the client name 297 is shown stored sequentially in (persistent) scope table 287. In addition, if a "second begin scope" instruction is next received by the client library—thus indicating that a nested scope is invoked—a second child scope table 283 is created and associated with the parent scope table 281 via a reference 285 stored in the scope table (the reference is inserted in scope table 281 instead of, e.g., a local resource name). In this illustration, the client finds or registers a scanner resource, names the scanner resource "scanner" 311 and places the "scanner" resource in persistent name-folder 307 (which is a subfolder of parent persistent name-folder 297). In some embodiments, when the client names a resource and places it in a persistent name-folder, the core also automatically places the scanner's global name (e.g., the scanner's URL 309) in the name-folder 309.

Accordingly, in some embodiments, scope tables, e.g., 281 and 283, are created into a tree structure where branches of the tree reflect a further nested scope table. In addition, the tracking data inserted into the scope tables, e.g., 281 and 283, consists of the local client-specific resource names provided by the client to the resource, e.g., 293. The reason for including local resource names into the scope tables is because, via the name-folders, e.g., 297 and 307, the global core-specific resource names for the resources, e.g., 305 and 309, may be discovered by indexing the name-folders, e.g., 297 and 307, with the local client-specific resource names. Global names 305 and 309 may, in turn, be used by the client library or core to index all client-related information pertaining to the resource named by the global name, e.g., 305 or 309, for purposes of deletion from the system. Thus, when the client library receives a "second end scope" instruction, and proceeds to delete the client-specific resource data tracked by, in this example, scope table 283, all of the relevant client-specific resource data to be deleted (e.g., from the name-folders and the repository) may be accessed using the client-specific resource name in combination with the client name-folders. In sum, the client library sequentially deletes all name-bindings in the name-space 277 tracked in scope table 283, and in addition, the client library deletes all metadata information associated with the global name, e.g., 309, from the repository. The client library similarly deletes the client-specific resource data from scope table 281 when the "first end scope" instruction is received.

In some embodiments, a similar tracking data structure, i.e., scope tables, may be used to track transient client-specific resource data. In some embodiments, the transient client-specific resource data is stored as resource global names generated by the core (note that the client does not need to explicitly name a resource and place it in a transient name-folder). Thus, when an "end scope" instruction is received, the client library uses the transient scope tables to locate client-specific resource data indexed by core-supplied global resource names in the client-space and the repository for subsequent. In some embodiments, the temporal scope instructions may be identified with, for example, a parameter. This enables clients to essentially name temporal scopes for selective application to particular types of events. Thus, for example, a client may invoke a temporal scope with a first parameter indicating that the temporal scope is used to group chronological resource usage in reference to a particular subject matter, for example, printing resources in a particular city. Thus, the use of temporal scopes which may be specifically referenced by the client (e.g., by passing an identifying parameter in a method call) enables a client to jump from one temporal scope to a second temporal scope and, perhaps, to a third temporal scope, wherein resource usage is tracked under the current temporal scope.

Although particular embodiments of the present invention have been shown and described, it will be obvious to one skilled in the art that changes and modifications may be made without departing from the present invention in its broader aspects, and therefore, the appended claims are to encompass within their scope all such changes and modifications that fall within the true scope of the present invention.

We claim:

1. A method of programmatically managing a lifetime of client-specific data objects over one or more client sessions, the method comprising:
   receiving a first begin scope instruction;
   tracking one or more first client-specific data objects in response to the first begin scope instruction;
   receiving a first end scope instruction, wherein the first begin scope instruction and the first end scope instruction include information identifying the first begin scope instruction and the first end scope instruction; and
   removing the first client-specific data objects in response to the first end scope instruction.

2. The method of claim 1, further comprising:
   if the first begin scope instruction includes a transient scope instruction and a current client session terminates, then removing the first client-specific resource data objects prior to the first end scope instruction.

3. The method of claim 1, further comprising:
   if the first begin scope instruction includes a transient scope instruction and a current client session terminates, then removing the first client-specific resource data objects prior to the first end scope instruction; and
   if the first begin scope instruction includes a persistent scope instruction, and one or more of the first client-specific resource data objects is designated persistent in response to a client instruction, then:
      if a current client session terminates, then storing the designated persistent client-specific data objects for use in the next client session.

4. The method of claim 3, wherein the client designates the persistent data objects by naming the data objects in a persistent folder in the client name-space.

5. A method of programmatically managing a lifetime of client-specific data objects over one or more client sessions, the method comprising:
   receiving a first begin scope instruction;
   tracking one or more first client-specific data objects in response to the first begin scope instruction;
   receiving a first end scope instruction;
   removing the first client-specific data objects in response to the first end scope instruction; and
   if the first begin scope instruction includes a persistent scope instruction, and one or more of the first client-specific resource data objects is designated persistent in response to a client instruction, then:
      if a current client session terminates, then storing the designated persistent client-specific data objects for use in a next client session.

6. A method of programmatically managing a lifetime of client-specific data objects over one or more client sessions, the method comprising:
   receiving a first begin scope instruction;
   tracking one or more first client-specific data objects in response to the first begin scope instruction;
   receiving a first end scope instruction;
   removing the first client-specific data objects in response to the first end scope instruction
   receiving a second begin scope instruction, wherein the second begin scope instruction is received after the first begin scope instruction and before the first end scope instruction;
   tracking one or more second client-specific resource data objects starting with the second begin scope instruction;
   pausing the tracking of the first client-specific resource data;
   receiving a second end scope instruction before receiving the first end scope instruction;
   removing the second client-specific resource data objects in response to the second end scope instruction; and
   resuming tracking the first client-specific resource data objects.

7. The method of claim 6, further comprising:
   if the first and second begin scope instructions include a transient scope instruction and a current client session terminates, then removing the first and second client-specific resource data objects prior to the first and second end scope instructions.

8. The method of claim 6, further comprising:
   if the first and second begin scope instructions include a persistent scope instruction, and one or more of the first and second client-specific resource data objects are designated persistent in response to a client instruction, then:
      if a current client session terminates, then storing the designated persistent first and second client-specific data objects for use in a next client session.

9. The method of claim 6, wherein the client designates the persistent data objects by naming the data objects in a persistent folder in the client name-space.

10. The method of claim 6, further comprising:
    if the first and second begin scope instructions include a transient scope instruction and a current client session terminates, then removing the first and second client-specific resource data objects prior to the first and second end scope instructions; and
    if the first and second begin scope instructions include a persistent scope instruction, and one or more of the first and second client-specific resource data objects are designated persistent in response to a client instruction, then:
       if a current client session terminates, then storing the designated persistent first and second client-specific data objects for use in a next client session.

11. The method of claim 6, wherein the first begin scope instruction includes a persistent scope instruction and the second begin scope instruction includes a transient scope instruction.

12. A computer system for programmatically managing the lifetime of client-specific resource data objects over one or more client sessions, the computer system comprising:
    one or more computers interconnected by a computer network; a computer program executing on at least one the computers; wherein the computer program further comprise computer instructions for:
       receiving a first begin scope instruction;
       tracking one or more first client-specific resource data objects in response to the first begin scope instruction;
       designating persistent data objects by providing a name for the data objects in a persistent folder in the client name-space in response to a client instruction;
       receiving a first end scope instruction; and
       removing the first client-specific resource data objects in response to the first end scope instruction.

13. The computer system of claim 12, wherein the computer program further comprises computer instructions for:

if the first begin scope instruction includes a transient scope instruction and a current client session terminates, then removing the first client-specific resource data objects prior to the first end scope instruction.

14. The computer system of claim 12, wherein the computer program further comprises computer instructions for:
if the first begin scope instruction includes a persistent scope instruction, and one or more of the first client-specific resource data objects is designated persistent in response to a client instruction, then:
if a current client session terminates, then storing the designated persistent client-specific data objects for use in a next client session.

15. The computer system of claim 12, wherein the computer program further comprises computer instructions for:
if the first begin scope instruction includes a transient scope instruction and a current client session terminates, then removing the first client-specific resource data objects prior to the first end scope instruction; and
if the first begin scope instruction includes a persistent scope instruction, and one or more of the first client-specific resource data objects is designated persistent in response to a client instruction, then:
if a current client session terminates, then storing the designated persistent client-specific data objects for use in the next client session.

16. The computer system of claim 12, wherein the first begin scope instruction and the first end scope instruction include information identifying the first begin scope instruction and the first end scope instruction.

17. A computer system for programmatically managing the lifetime of client-specific resource data objects over one or more client sessions, the computer system comprising:
one or more computers interconnected by a computer network; a computer program executing on at least one the computers; wherein the computer program further comprise computer instructions for:
receiving a first begin scope instruction;
tracking one or more first client-specific resource data objects in response to the first begin scope instruction;
receiving a first end scope instruction;
removing the first client-specific resource data objects in response to the first end scope instruction
receiving a second begin scope instruction, wherein the second begin scope instruction is received after the first begin scope instruction and before the first end scope instruction;
tracking one or more second client-specific resource data objects starting with the second begin scope instruction;
pausing the tracking of the first client-specific resource data objects; receiving a second end scope instruction before receiving the first end scope instruction;
removing the second client-specific resource data objects in response to the second end scope instruction; and
resuming tracking the first client-specific resource data objects.

18. The computer system of claim 17, wherein the computer program further comprises computer instructions for:
if the first and second begin scope instructions include a transient scope instruction and a current client session terminates, then removing the first and second client-specific resource data objects prior to the first and second end scope instructions.

19. The computer system of claim 17, wherein the computer program further comprises computer instructions for:
if the first and second begin scope instructions include a persistent scope instruction, and one or more of the first and second client-specific resource data objects are designated persistent in response to a client instruction, then:
if a current client session terminates, then storing the designated persistent first and second client-specific data objects for use in a next client session.

20. The computer system of claim 17, wherein the computer program further comprises computer instructions for designating the persistent data objects by providing a name for the data objects in a persistent folder in the client name-space in response to a client instruction.

21. The computer system of claim 17, wherein the computer program further comprises computer instructions for:
if the first and second begin scope instructions include a transient scope instruction and a current client session terminates, then removing the first and second client-specific resource data objects prior to the first and second end scope instructions; and
if the first and second begin scope instructions include a persistent scope instruction, and one or more of the first and second client-specific resource data objects are designated persistent in response to a client instruction, then:
if a current client session terminates, then storing the designated persistent first and second client-specific data objects for use in a next client session.

22. The computer system of claim 17, wherein the first begin scope instruction includes a persistent scope instruction and the second begin scope instruction includes a transient scope instruction.

* * * * *